(12) United States Patent
Vinberg

(10) Patent No.: US 9,524,179 B2
(45) Date of Patent: Dec. 20, 2016

(54) VIRTUAL-MACHINE-DEPLOYMENT-ACTION ANALYSIS

(75) Inventor: Anders Vinberg, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 538 days.

(21) Appl. No.: 13/102,034

(22) Filed: May 5, 2011

(65) Prior Publication Data

US 2012/0284710 A1 Nov. 8, 2012

(51) Int. Cl.
*G06F 9/455* (2006.01)
*G06F 9/445* (2006.01)

(52) U.S. Cl.
CPC ............. *G06F 9/45533* (2013.01); *G06F 8/61* (2013.01)

(58) Field of Classification Search
None
See application file for complete search history.

(56) References Cited

U.S. PATENT DOCUMENTS

| | | | | |
|---|---|---|---|---|
| 7,577,722 B1* | 8/2009 | Khandekar | ......... | G06F 9/45558 709/220 |
| 7,640,540 B2 | 12/2009 | Snover et al. | | |
| 8,321,558 B1* | 11/2012 | Sirota et al. | .................. | 709/224 |
| 8,739,160 B1* | 5/2014 | Dobrovolskiy et al. | ........... | 718/1 |
| 2008/0163194 A1* | 7/2008 | Dias et al. | ..................... | 717/174 |
| 2008/0184225 A1 | 7/2008 | Fitzgerald et al. | | |
| 2009/0125904 A1 | 5/2009 | Nelson | | |
| 2009/0133017 A1 | 5/2009 | Boogert et al. | | |
| 2009/0164993 A1* | 6/2009 | Flake et al. | ........................ | 718/1 |
| 2009/0204961 A1* | 8/2009 | DeHaan et al. | .................. | 718/1 |
| 2009/0300173 A1 | 12/2009 | Bakman et al. | | |
| 2009/0307308 A1* | 12/2009 | Siegemund et al. | .......... | 709/203 |
| 2010/0100877 A1* | 4/2010 | Greene et al. | ..................... | 718/1 |
| 2011/0022694 A1* | 1/2011 | Dalal | .................. | H04L 41/0843 709/222 |
| 2012/0284708 A1* | 11/2012 | Anderson, III | ..... | G06F 9/45558 718/1 |

OTHER PUBLICATIONS

Shiraz et al., "A study on virtual machine deployment for application outsourcing in mobile cloud computing", Dec. 18, 2012, Springer Science & Business Media New York, pp. 946-964.*
"Microsoft System Center Virtual Machine", Retrieved at <<http://download.microsoft.com/download/4/d/b/4db1a6b2-292b-4fd9-8d0c-ed21afa9d368/SCVMM2008_Reviewer's_Guide_082808.pdf>>, Aug. 2008, pp. 72.
"Hyper-V Overview", Retrieved at <<http://www.virtualizationadmin.com/articles-tutorials/general-virtualization-articles/chapter-2-hyper-v-overview.html?printversion>>, Aug. 19, 2009, pp. 43.
"Microsoft System Center Virtual Machine Manager 2008", Retrieved at <<http://download.microsoft.com/download/0/8/9/089003c8-5b65-4e5b-bdf6-4b2e02968ad1/SCVMM2008_White_Paper_final_090208PD.pdf>>, Sep. 2008, pp. 17.
"Windows PowerShell Getting Started Guide", Retrieved at <<http://msdn.microsoft.com/en-us/library/aa973757(VS.85).aspx>>, May 20, 2009, pp. 2.

* cited by examiner

*Primary Examiner* — Kenneth Tang
(74) *Attorney, Agent, or Firm* — Henry Gabryjelski; Kate Drakos; Micky Minhas

(57) ABSTRACT

Actions performed when one or more virtual-machine-deployment instructions are executed are exposed. The actions can subsequently be analyzed to identify potential inefficiencies or other issues in the process of deploying one or more virtual machines. In furtherance thereof, metadata associated with the actions, such as performance information, can also be attached to relevant actions.

19 Claims, 8 Drawing Sheets

VIRTUAL-MACHINE-DEPLOYMENT-ACTION ANALYSIS

BACKGROUND

Virtual-machine technology facilitates increased physical resource utilization as well as agile machine provisioning, among other things. Traditionally, software applications are tightly coupled to physical servers on which they run. Virtual-machine technology provides a layer of abstraction between the software applications as well as physical hardware and enables provisioning of multiple virtual machines on a single physical server (a.k.a., host), for example. As a result, workloads can be consolidated to improve physical asset utilization, and machines can be rapidly deployed and decommissioned, as needed.

A virtual machine (VM) is a piece of software that emulates a physical computer utilizing a virtual hard disk (VHD), among other things. A VHD is a physical hard disk analogue for a virtual machine. Accordingly, the VHD can include like representations for data and structural elements, such as files and folders. An operating system (OS) (a.k.a. guest operating system) can be installed on the VHD. Further, one or more applications can be installed on the VHD, and the OS can support execution of the one or more applications with respect to the virtual machine.

Placing a VM on a host machine involves allocating resources for the VM in light of competition from other VMs. The primary goal of placement is to ensure that VMs are provided with requisite resources to operate. In one implementation, slot allocation is employed, where the average amount of resources a VM consumes is determined, and host capacity is divided to determine a fixed number of slots. Each VM is then placed in a single slot regardless of actual resource usage. Alternatively, a more computationally intense approach can be employed, wherein actual resource requirements are provided for a VM and used for placement. Such requirements include a number of central processing units (CPUs), amount of memory, and connectivity needs (e.g., network I/O, storage I/O). Acquired resource requirements are subsequently employed to allocate required hardware resources automatically.

Furthermore, resource allocation can be optimized for a particular resource concerns including central processing unit (CPU) power, memory, network bandwidth, storage capacity, power, and cooling. For example, host machines can be densely packed with as many VMs as they can support and used machines can be shut down to optimize for power consumption. In another example, VMs can be dispersed thinly across many host machines to minimize the workload of each host and optimize for failure impact. The above scenarios can be termed explicit optimizations, which can be enabled by a virtual-machine-management system, for example. Alternatively, simulations can be run where an administrator identifies potential changes to the system, and the simulation reports the result of the simulation. The administrator can then review the result and determine whether the result is acceptable or if further modifications should be made.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to virtual-machine-deployment-action analysis. Actions performed by one or more virtual-machine-deployment instructions upon execution can be exposed to facilitate analysis and subsequent modification thereof. For example, the exposed actions can be utilized to identify and optimize for potential inefficient actions taken during virtual-machine deployment. Additional metadata concerning actions, including performance information, can also be exposed with respect to one or more actions to further aid analysis.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below are generally directed toward facilitating analysis of virtual-machine-deployment actions. It is desirable to optimize deployment of virtual machines. To that end, various explicit optimizations, provided by a virtual-machine-management system, for example, are conventionally employed to optimize deployment with respect to a particular resource (e.g., CPU power, memory, network bandwidth, disk capacity, AC power . . . ). Furthermore, simulations can be utilized to report the end result of various optimization techniques. As described herein, actions associated with a virtual-machine deployment can be exposed to aid system administrators in deploying virtual machines. In other words, actions taken that produce a result are provided to allow analysis of the means employed to achieve an end result. Additionally, various metadata concerning actions, such as performance information, can be collected and supplied with respect to the actions to further aid analysis.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
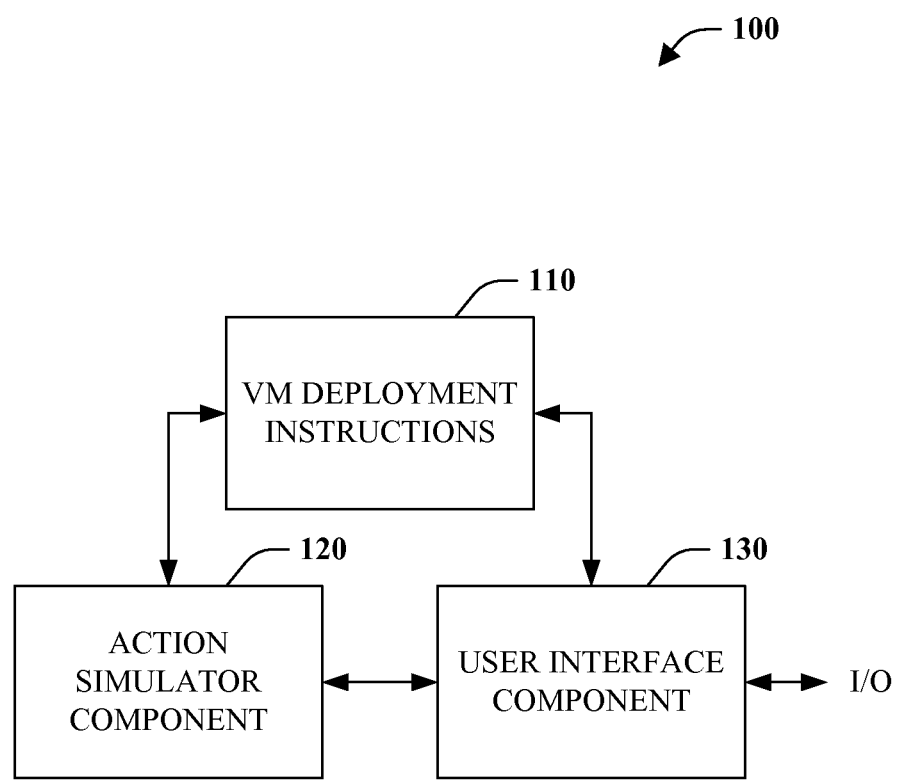
FIG. 1 is a block diagram of a system that facilitates analysis of virtual-machine-deployment actions.

Referring initially to FIG. 1, a system 100 that facilitates analysis of virtual-machine-deployment actions is illustrated. Virtual-machine-deployment instructions 110 correspond to a collection of computer-executable logic specified at an arbitrary level of abstraction (e.g., high-level statements, machine code . . . ) that directs a computer to deploy one or more virtual machines with respect to one or more host machines (e.g., computers/servers). Furthermore, the instructions 110 can correspond to migration of a virtual machine as opposed to initiating deployment since migration includes deploying a copy of a virtual machine at a second location and removing the original virtual machine from a first location. Accordingly, the instructions 110 can also be local or geographically distributed across a communication network (e.g., wide area network (WAN)). By way of example, and not limitation, the instructions 110 can deploy a number of local and/or remote virtual machines that between them implements an order processing service.

The action simulator component 120 exposes one or more actions that are performed by one or more of the instructions when executed. In other words, execution is simulated such that rather than executing the instructions, actions that would have been taken by the instructions are captured. To enable such functionality, the action simulator component 120 can employ knowledge, or information acquired by various means regarding actions performed by instructions. For example, such knowledge can be explicitly provided and/or otherwise determined or inferred, for instance by way of code instrumentation and tracing, among other things. However, simulation solely with such information can be difficult to achieve and can confine simulation to situations planned for and covered by acquired metadata. Accordingly, the action simulator component 120 can be configured to execute the virtual machine instructions 110, follow logic embedded therein, and make decisions that would be made, but at the last moment, just before an action is taken, it reports back the action that it would have taken instead of actually performing the action. In other words, the simulation is driven from real execution logic. This eliminates the need for analysis or special information to drive the simulation. Of course, information can still employed, but it is the same information utilized to perform deployment operations. More specifically, in a virtual machine deployment system, there is information about the servers, how much capacity they have, how many processors, how much memory, whether it has redundant, highly reliable power supplies and other metadata such as whether a sever or storage device is certified for having confidential customer data. Stated differently, this is information utilized by a real system, and the simulation can utilize the same information. Actions can be exposed by the action simulator component 120 to the user interface component 130.

The user interface component 130 is configured to provide output to, and receive input from, an information technology professional, such as a system administrator, in various manners. In particular, the user interface component 130 can be configured to enable an administrator to interact with the virtual-machine-deployment instructions 110. More specifically, an administrator can initiate action simulation of the instructions 110 by way of the action simulator component 120, for example, and in response receive actions that would have been performed. Based on these results, as well as other information, the administrator may choose to modify the instructions 110 for any number of reasons as a function of action consequences (e.g., unanticipated) including optimization.

By way of example and not limitation, actions can reveal that a large image file, or virtual hard disk, would be moved so that it is accessible on a machine where the virtual machine is started. However, since such image files are typically quite big (e.g., several gigabytes), a large portion of network bandwidth would be occupied to copy the image file to a particular machine. Recognizing this consequence, utilizing the user interface component 130 an administrator can modify the instructions 110 to start the virtual machine on the machine where the image file currently resides to avoid extensive use of network bandwidth. In another instance, where an image file is stored on a storage area network (SAN) several switches can be configured to enable access on a particular machine without a large copy operation. In any event, by simulating the actions an administrator has the opportunity to observe the fact that such a large copy operation would be employed and change the instructions 110 to avoid it.

Furthermore, instructions are commonly declarative rather than procedural. Accordingly, a user can state "VM 1 needs these resources and needs to be connected to another VM on this server" rather than "copy this VHD to this storage device and then start up the VM on this server," for example. This is one reason the simulation is valuable since it is not always obvious what set of actions the declarative description will lead to, unlike the procedural case where the expansion of instructions to more detailed instructions is relatively straightforward.

Further yet, the user interface component 130 can provide mechanisms that positively affect user experience. For example, the user interface component 130 can provide a filter that allows an administrator to focus on particular actions or instructions of interest. Further, the user interface component 130 can enable interaction to be performed at a high level of abstraction in terms of interaction with graphical elements and/or a low level of abstraction in terms of program code, instructions, or the like. Still further yet, there can be some overlap with respect to the levels of interaction to facilitate learning, for instance. By way of example and not limitation, an administrator can interact with the virtual deployment instructions 110 in a high-level graphical interface and have the option to view and work directly with the code at a lower level.

Action simulation provides a practical and realistic means of optimization. Truly reliable optimization techniques, including those provided by conventional virtual-machine-management systems, involve rigorous mathematic analysis. Action simulation does not have the reliability of mathematical analysis, but has practical benefits. More specifically, issues can be discovered that would be at least difficult to express in a full mathematical analysis because facts that influence an outcome are often not explicitly known. While action simulation has a risk of a false negative (e.g., negative warning indicating nothing bad will happen), the risk is small compared with the strength of the simulation to locate unanticipated issues. Action simulation need not replace mathematical optimization. However, mathematical optimization often overestimates the amount a typical information technology work or department has about an environment, thereby making simulation more realistic that mathematical optimization. Accordingly, action simulation is often more practical and more realistic than mathematical analysis even though it is not strictly as powerful.

Furthermore, at least actions can be exposed with respect to conventional and novel optimization procedures provided by virtual-machine-management systems, for example. As a result, inspection of actions is enabled as opposed to viewing such procedures as black boxes. Among other things, exposing such instructions provides administrators with piece of mind as to action that will be performed, if instructions are executed.

Figure 2:
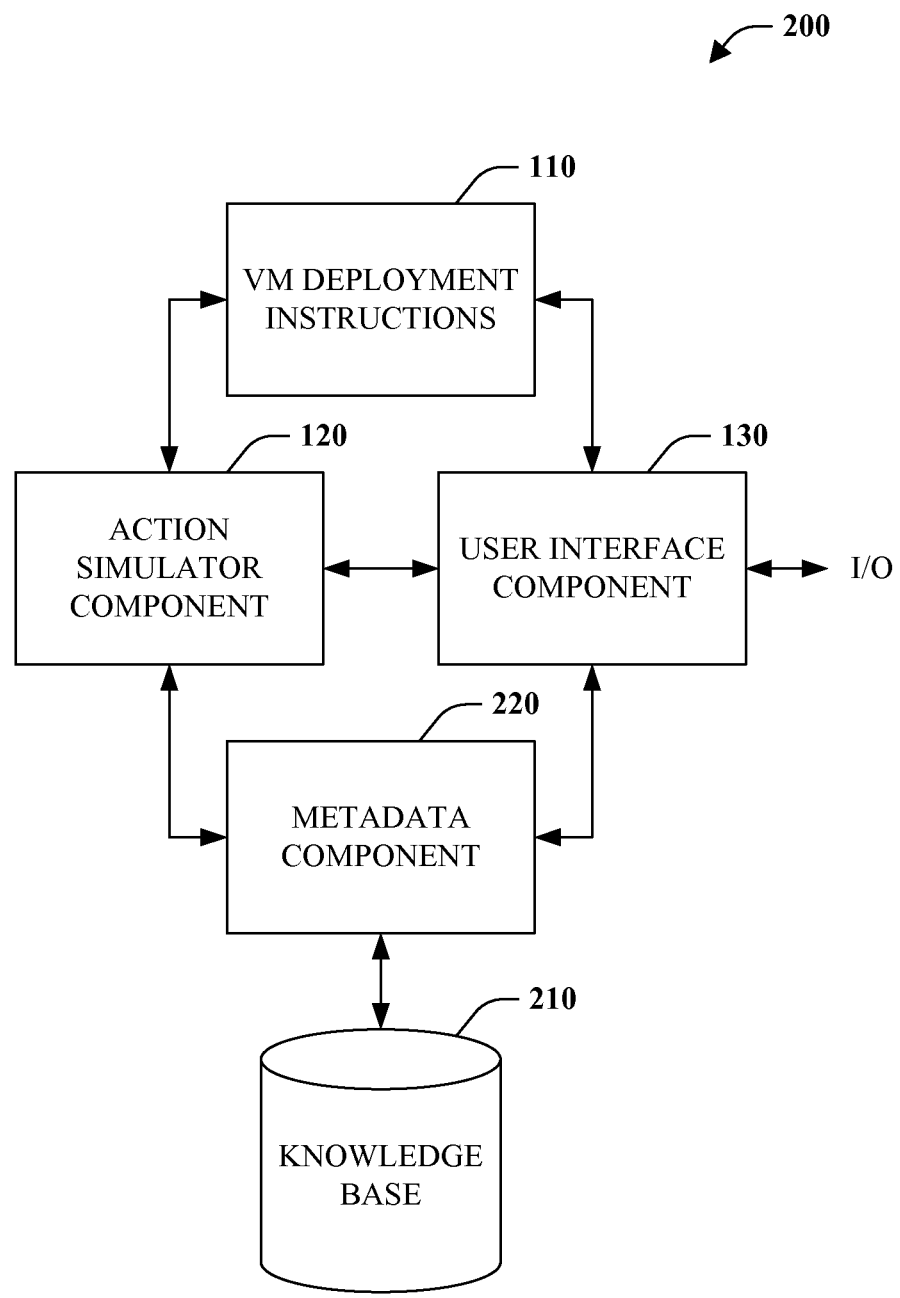
FIG. 2 is a block diagram of a system that facilitates analysis of virtual-machine-deployment actions including action metadata.

FIG. 2 depicts system 200 that facilitates analysis of virtual-machine-deployment actions. Similar to system 100 of FIG. 1, the system 200 includes virtual-machine-deployment instructions 110, action simulation component 120, and user interface component 130. In brief, the action simulation component 120 can expose actions performed when the virtual-machine-deployment instructions 110 are executed. Such actions can be provided to an administrator for analysis and potential alteration of the virtual-machine-deployment instructions. Further, the system 200 includes a knowledge base 210 and metadata component 220.

The knowledge base 210 is a repository of metadata, or in other words, information pertaining to actions. The knowledge base 210 can include a collection of such information from various sources including, without limitation, feedback from a plurality of systems and/or administrators, or more generally a virtual-machine ecosystem. The information can be anonymous so that sensitive information in not exposed. Further, a first set of information can be correlated, statistically analyzed, or otherwise processed to produce a second set of information resulting from the first set of information.

The metadata component 220 is configured to retrieve and provide information or metadata stored in the knowledge base 210 relating to identified actions. The metadata component 220 can acquire the identified actions from the action simulator component 120 directly or from the user interface component 130 indirectly. Based thereon, pertinent information can be provided to the user interface component 130 such as but not limited to performance information.

Consider, for instance, failure rates. For example, a particular instruction can be annotated with a failure rate of 0.1%. Furthermore, if the same instruction is performed one hundred times, an indication can be provided that the failure rate over an entire process is 10%. This is very meaningful to administrators. As result, an administrator might look for an alternate way of performing a process that mitigates a failure rate, such as either reducing the failure rate associated with individual instructions or reducing the number of instructions. Alternatively, an administrator might add process failure correction, which means after each action, a determination is made as to whether the action failed, and if the process failed, a cleanup process is performed and execution attempted again.

As another example, physical servers, storage area networks, communication networks, among other things, can be annotated with reliability information such as availability. For instance, instance a server can be available 99.9% of the time and if a cluster of two servers is used the availability becomes 99.99% since if one fails another can take over. In other words, each component can be annotated with reliability, which can be employed to calculate reliability of an entire system.

The functionality afforded by the knowledge base 210 and metadata component 220 can be applied in various situations. Often, cases involve a model or description of a situation that is being analyzed. For example, a model can be of a service or distributed application such as with an order processing system. Accordingly, information can be specified with respect to deployed virtual machines, virtual disk drives, and so on. In another instance, a model can describe an environment such as servers, networks, etc. Overall, a model can be annotated with information and presented to an administrator to assist in analyzing a system.

Additionally, metadata provided by the metadata component 220 in cooperation with the knowledge base 210 is not limited to performance type information. In accordance with one embodiment, information concerning why particular actions are performed can be exposed where it is able to be determined or inferred. For example, a reason can be exposed that notes the action is response to the existence of a set of particular circumstances. Such rationale can be specified explicitly locally or remotely simply retrieved and linked with related actions. Alternatively, a reason can be inferred based on contextual information such as proceeding and subsequent actions or instructions and/or community-based information. Regardless, the effect is that an administrator is provided with valuable information with respect to analysis of virtual-machine-deployment instructions.

Figure 3:
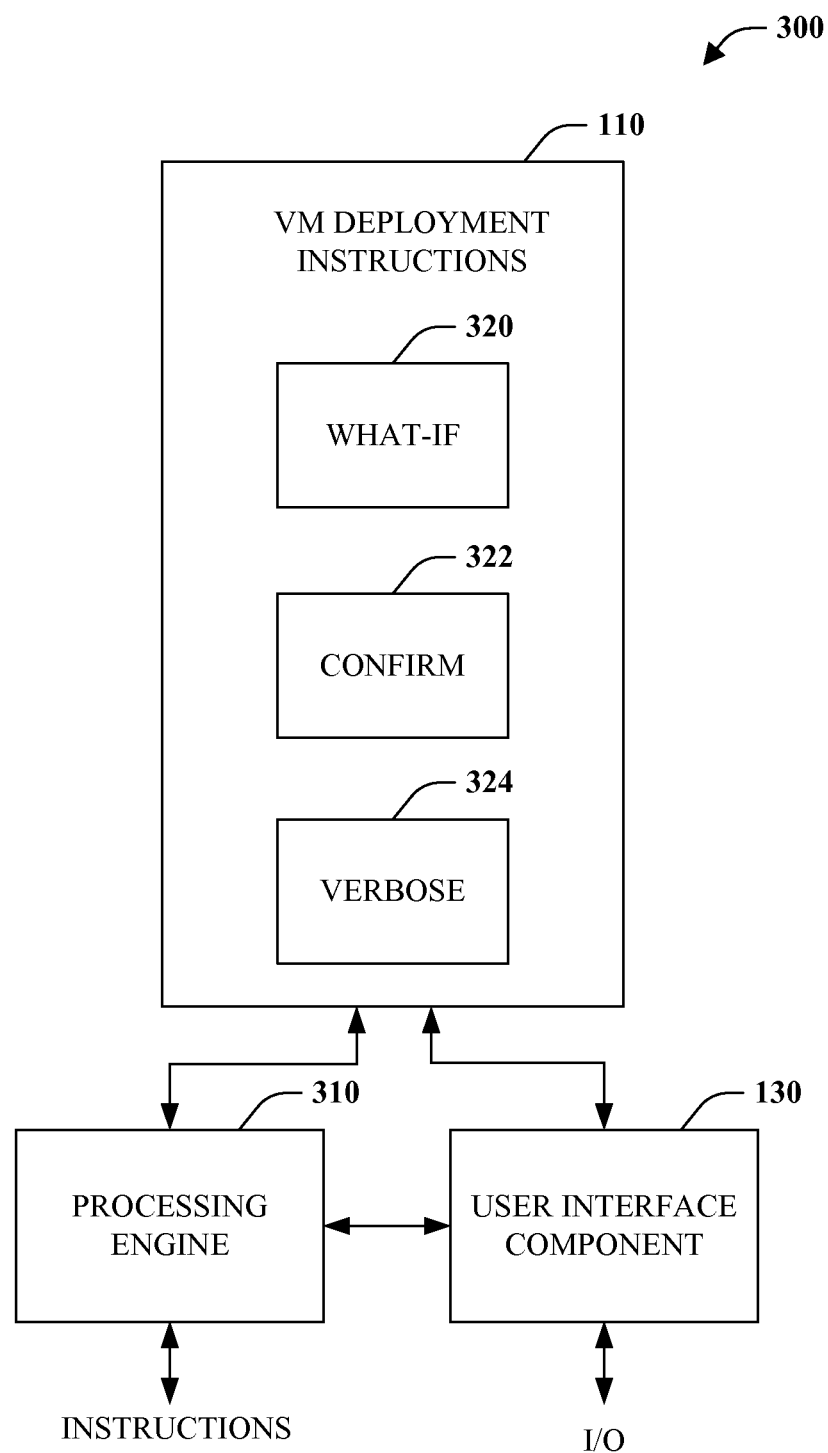
FIG. 3 is a block diagram of one particular implementation of the system of FIG. 1.

FIG. 3 illustrates a system 300 of facilitating virtual-machine deployment in accordance with one particular embodiment. As shown, the system 300 includes virtual-machine-deployment instructions, and a user interface component 130 similar to system 100 of FIG. 1. Furthermore, the functionality of the action simulation component 120 of system 100 is incorporated within a processing engine as well as the virtual-machine-deployment instructions 110. More specifically, the processing engine component 310 can be configured to operate in a number of alternate execution modes that expose actions related to one or more virtual-machine-deployment instructions. Moreover, the virtual-machine-deployment instructions 110 can include instructions for executing in one or more alternate execution modes, namely what-if, confirm, and verbose.

In other words, if the processing engine component 310 receives a parameter that indicates execution is to be performed in a what-if mode, it executes instructions specified with respect to the what-if code segment 320. Similarly, if the processing engine component 310 is configured to operate in confirm mode or verbose mode, confirm code segment 322 or verbose code segment 324, respectively, are executed. The what-if code segment 320 specifies action virtualization such that actions performed upon execution are output without actually performing the actions. The confirm code segment 322 provides functionality for outputting an action to be taken and requesting user input as to whether to proceed or not with respect to performing the action. The verbose code segment 324 offers functionality that executes instructions as is typically done, but outputs the actions that were taken. In sum, the alternate execution modes offer varying degrees of caution with respect to execution instruction execution, namely full, some, and none.

More specifically, a system can go through its normal logic and where it comes to a place where it would normally execute such as:

```
...
do-action-foo
...
```

Instead, the code reads:

```
...
if what-if-mode {
    display "action-foo"
}
elseif verbose-mode {
    display "action-foo"
    do-action-foo
}
elseif confirm-mode {
    if (ask "action-foo?") {
        do-action-foo
    }
}
else {
    do-action-foo
}
...
```

This pattern of code can be inserted at places in the VM placement system where an action is taken. That is what ensures that the simulation is correct: It uses the same logic as the real system when does its real work. Of course, this code could be streamlined by having a utility module for doing "what-if," "verbose," and/or "confirm." In this situation, the action system can feed the command "action-foo" to this module and it would handle execution/display. In other words, a common utility module can take the command "action-foo" and based on the operating mode, namely "normal," "what-if," "verbose," "confirm," performs the appropriate logic. This provides a degree of convenience. Nevertheless, it is to be appreciated that simulation is driven from real execution logic.

In this implementation, the burden of providing enabling functionality is placed upon a programmer. However, the programmer, who specifies the instructions, is in a good position to identify what actions are taken with respect to one or more instructions. Furthermore, the world of virtual-machine deployment involves many hardware and software components from various vendors or manufacturers. Since there is not a single place where knowledge can be collected about an entire process, there is not a convenient way to implement action simulation. Providing support at the level of instruction specification addresses this issue. Additionally, the process can be recursive. In other words, if a first instruction calls a second subservient instruction, the call can be parameterized by an execution mode, such as what-if, such that actions of the subservient instruction are returned and rolled up in the actions performed by the first instruction. This enables both local and distributed action simulation, among other things.

Many independent engineers or engineering teams build separate subsystems with different functionality. Accordingly, without recursion it would be difficult to pull together knowledge into one piece of simulation logic or into one database of metadata. Instead, each engineer or team can build systems with support for what-if/confirm/verbose logic. Any system that invokes a function that supports these options simply invokes the function with those option switches set. If the function takes a simple action, or invokes some other function that does not support those options, it handles simulation logic itself, as described above.

There is an unavoidable source of uncertainty: The decisions in the simulation logic depend on circumstances in the system at the time of execution. Accordingly, a simulation executed today may show different results from a simulation that is executed tomorrow. This is not avoidable, because if the system is fed a simulation of the circumstances expected tomorrow, that simulation would introduce the very uncertainty that comes from analytic analysis, which is avoided with this approach.

There are situations where sets of one or more instructions do not implement alternate modes of execution, such as what-if and confirm. In one instance, this can simply be accepted as a limitation. Alternatively, steps can be taken to convert such instructions into appropriately configured instructions.

Figure 4:
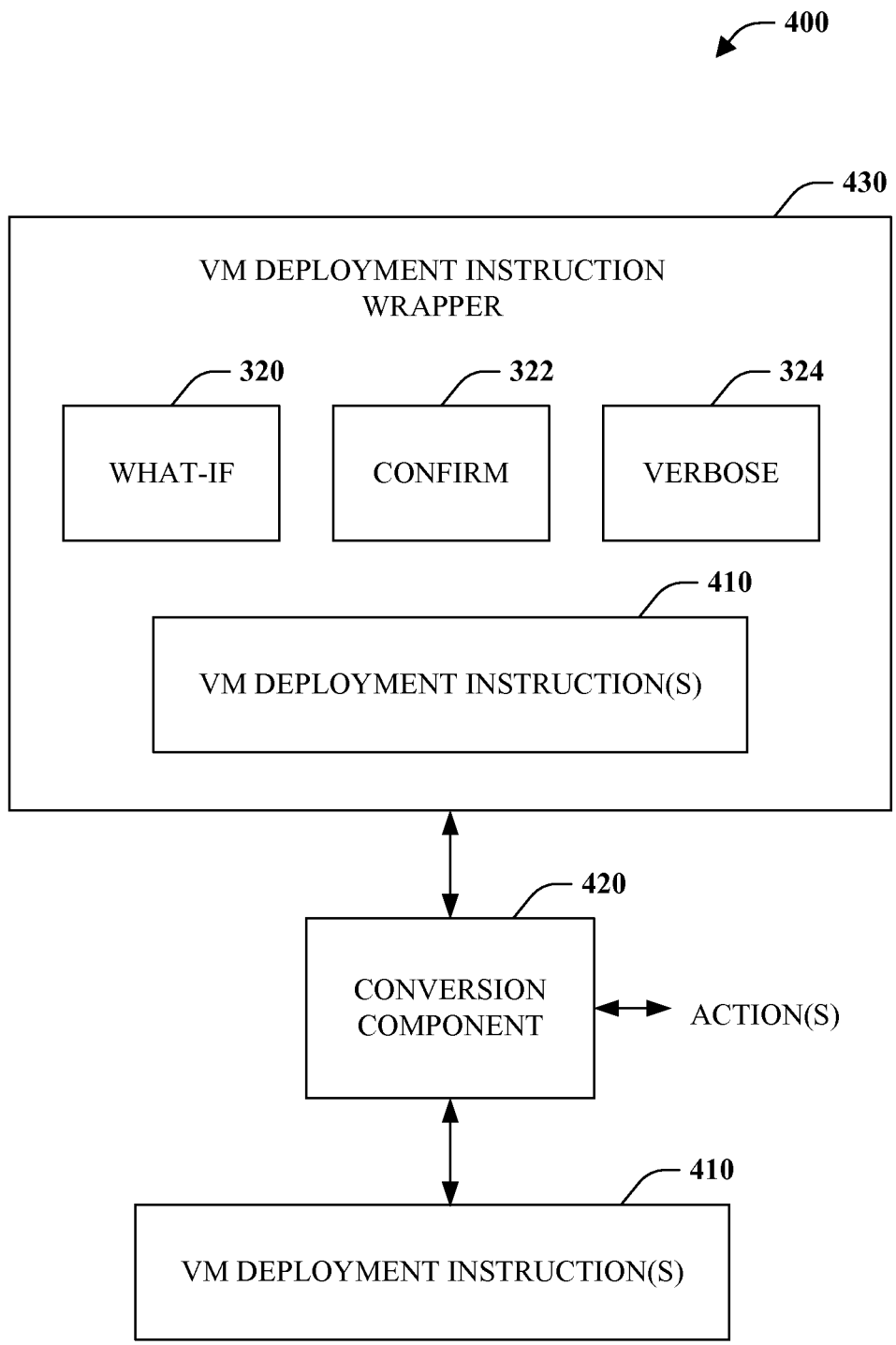
FIG. 4 is a block diagram of an instruction conversion system.

FIG. 4 illustrates an instruction conversion system 400. A set of virtual-machine-deployment instructions 410 does not support alternate execution modes by implementing what-if, confirm or verbose, for example. The conversion component 420 is configured to inject functionality to enable alternate execution modes. More specifically, in one embodiment, the conversion component 420 can wrap the set of virtual deployment instructions 410 with another set of instructions, or a wrapper 430, that does support alternate execution modes. As shown, the virtual-machine-deployment-instruction wrapper 430 provides the what-if code segment 320, confirm code segment 322, and verbose code segment 324, as described with respect to system 300 of FIG. 3. In operation, calls to the set of virtual-machine-deployment instructions 410 are intercepted and handled by the virtual-machine-deployment-instruction wrapper 430 consequently affording support for alternate execution modes.

Returning to FIG. 3, the what-if code segment 320, confirm code segment 322, and verbose code segment 324 can be extended to include functionality for determining and exposing why particular actions are specified. For example, the execution engine component 310 can receive "what-if" and "why" parameters from the user interface component 130 indicating a desire to receive actions that would be performed upon execution of the instructions as well as a rationale as to why these actions are employed. Returned results can include an action as well as reason why the action is to be performed such as based on the circumstances "X" it was determined that "Y." Such functionality can be implemented utilizing specification of reasons by a programmer alone or in combination with logic to determine or infer reasons from other reasons and/or context.

Further, the virtual-machine-deployment instructions 110 can operate with respect to a multitenant environment. A virtual machine can be deployed to a public data center the supports action simulation, alternate execution modes, or the like, but where strict security boundaries are employed to support a multitenant environment. More specifically, physical details will not be revealed about the data center. For example, where placement of a virtual machine is requested, the environment will place it and refuse to divulge details regarding where the virtual machine was placed (e.g., particular server). To accommodate this scenario, actions can be anonymized such that details are not provided and recursive actions can be successfully determined Typically, in a private data center, a server identifier or name is known, such as "95868." Accordingly, an action can say that particular files are copied to "server 95868," which is one of the servers in the private data center. In a multitenant environment, a server identifier will not be known. Accordingly, an action can specify that the particular files are copied to a server but not identify the specific server. In other words, the action is anonymized Further yet, subsequent actions should still be able to be determined even in light of the fact that the specific server, for example, is not identified.

Furthermore, rather than omitting the actual name, the server can be described with a pseudonym such as "MyServer3." This name is local only to this tenant and has no meaning in terms of the physical data center, or other tenants. However, the pseudonym can be helpful in interpreting the simulation. For example, the simulation could read:

```
...
copy vhd-foo to server MyServer1
copy vhd-bar to server MyServer2
copy vhd-xyz to server MyServer3
start MyServer2
...
```

Here, it is now known which VHD image was started. If everything were anonymized, meaning would not be able to be extracted from such descriptions.

System 300, and more particularly aspects of functionality provided by the processing engine component 310 and virtual-machine-deployment instructions 110 with respect to alternate execution modes, applies known techniques to a different domain. More specifically, Windows Powershell® employs basic what-if, confirm, and verbose functionality similar to that described above with respect to alternate execution modes. Windows Powershell® is a command-line shell with a scripting language built on top that is applicable to relatively simple operations such as rebooting a machine or reformatting a hard drive. In these cases, analysis is straightforward and deterministic (e.g., reboot or not). Here, such techniques are applied to a vastly more complex process of virtual-machine deployment, for example, where a series of virtual machines are deployed, and between the virtual machines, an order processing system is established by setting up databases allocating virtual hard disks, etc. Further, it is quite difficult to predict actions, especially where automatic optimization is involved, which means greater value in performing an action simulation or what-if analysis.

To date, the complexity of virtual-machine deployment dictated use of automatic optimization techniques based in rigorous mathematics, but whose actions resemble a black box to administrators. Although the automatic optimization techniques are beneficial, it is recognized that these techniques can be disconcerting for administrators. In particular, actions have consequences some of which can be bad as well as impossible to correct or rollback (e.g., irrevocable operations). This can make administrators nervous since to enjoy the benefits of the automatic optimization they need to allow execution and simply hope that that nothing goes wrong. In practice, however, some administrators may choose not to employ such optimizations for the same reason, resulting in sub-optimal deployments. By applying and extending concepts of what-if and confirm, in particular, to implement action simulation, administrators can be provided with information about actions to be performed to aid a decision as to whether to execute particular instructions, especially with respect to otherwise black box optimizations. Furthermore, the administrators are provided with an opportunity to modify the instructions to avoid some action or optimize execution, for example.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, such mechanisms can be employed to determine or infer actions performed upon execution of a particular set of one or more instructions as well as reasons for the actions.

Figure 5:
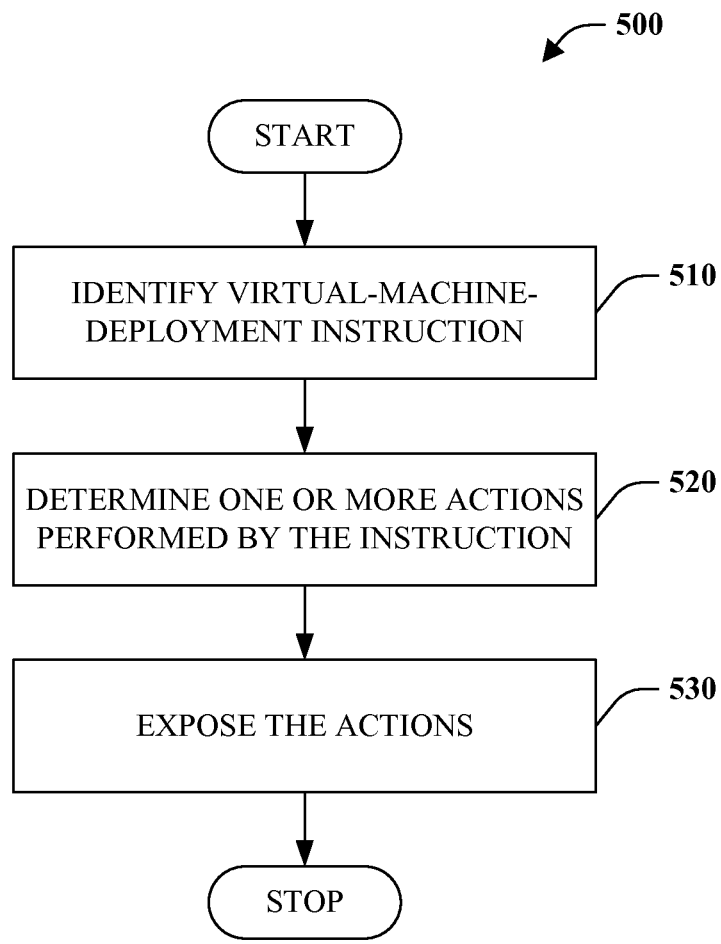
FIG. 5 is a flow chart diagram of a method of action simulation.
Figure 6:
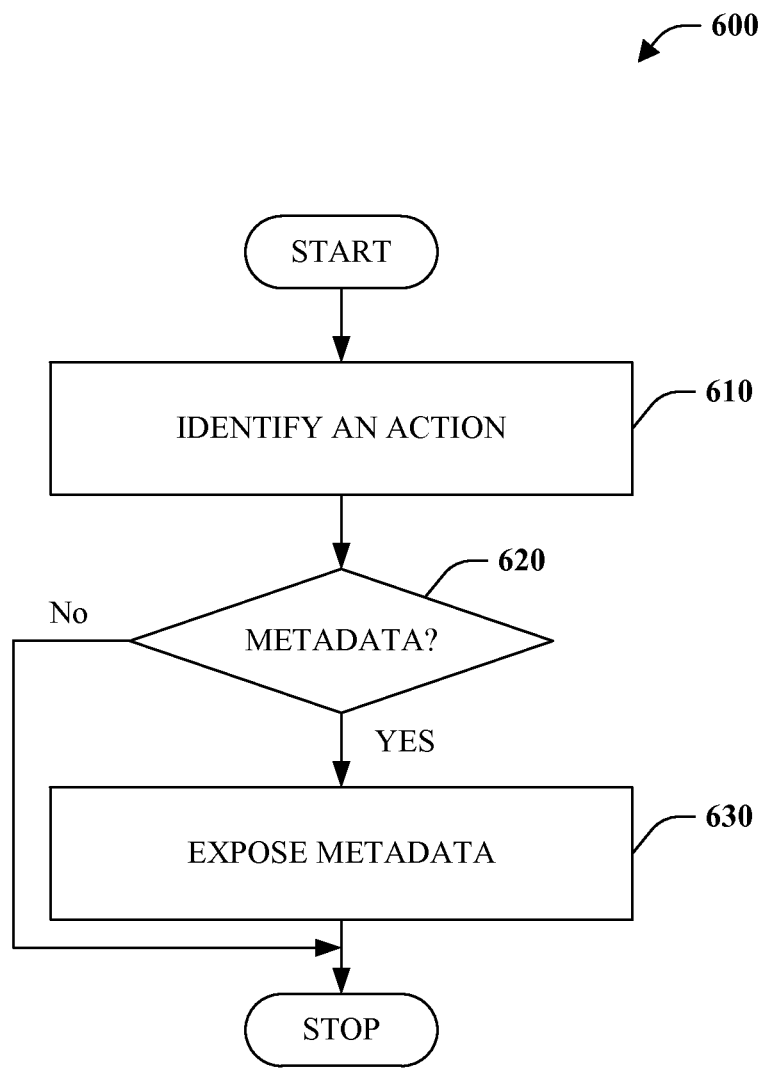
FIG. 6 is a flow chart diagram of a method of provisioning information regarding virtual-machine deployment.
Figure 7:
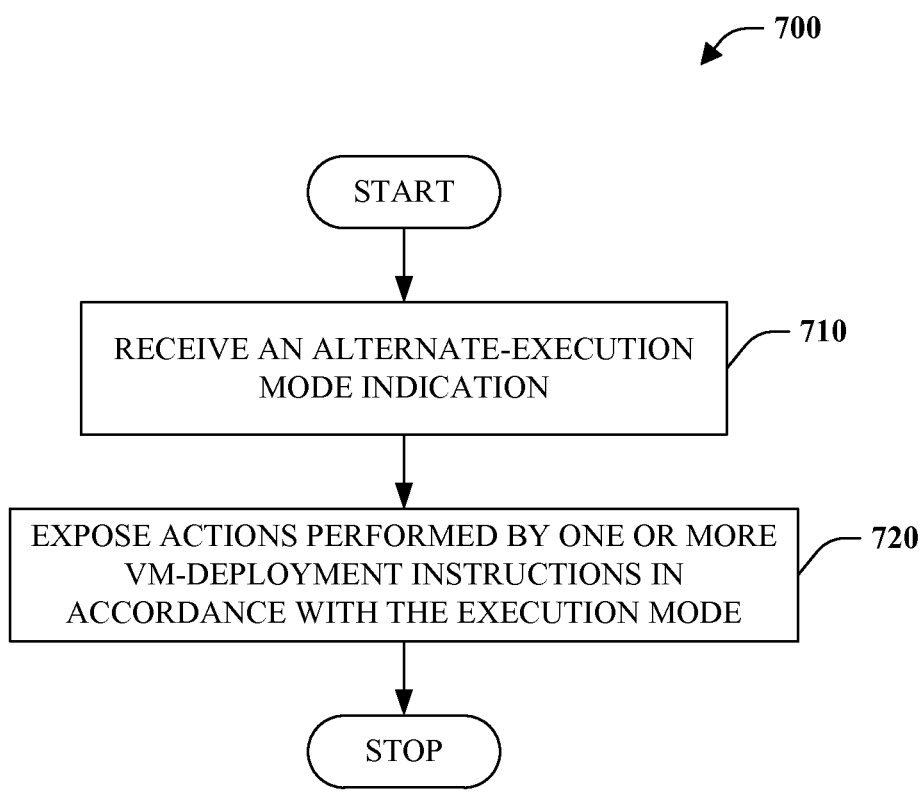
FIG. 7 is a flow chart diagram of a method of provisioning information regarding virtual-machine-deployment actions.

In view of the exemplary systems described supra, methodologies that may be implemented in accordance with the disclosed subject matter will be better appreciated with reference to the flow charts of FIGS. 5-7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 5, a method 500 of action simulation is illustrated. At reference numeral 510, a virtual-machine-deployment instruction is identified. The instruction can correspond to any instruction employed with respect to deploying one or more virtual machines with respect to one or more physical hosts. At numeral 520, the one or more actions performed by the instruction are determined or inferred. Such determination can involve executing virtual machine instructions and just prior to performing an action, identifying the action that would have been taken rather than actually performing the action. At numeral 530, one or more actions that are performed by an instruction upon execution are exposed. For example, the actions can be provided to a user interface for rendering.

FIG. 6 depicts a method 600 of provisioning information regarding virtual-machine deployment. At reference numeral 610, an action is identified with respect to deployment of a virtual machine. The action can correspond with some operation performed by one or more instructions upon execution. At numeral 620, a determination is made as to whether a metadata is available for the action. The metadata includes information about the action including but not limited to performance information such as failure rate, availability, or latency. Additionally or alternatively, the metadata can provide a reason why an action is performed. Such information can be collected from a variety of sources within the virtual-machine-management community including administers and systems themselves. Further, processing in the form of statistical analysis, for instance, can be optionally performed thereon to derive new or more valuable information. If, at 620, no metadata is available for an action ("NO"), the method 600 simply terminates. Otherwise ("YES"), the method 600 continues at 630, where the metadata is exposed, for instance by annotating the action with the metadata. Note that where the action includes a number of sub-actions, the action itself can be provided with the sum of metadata associated with the sub-actions. Accordingly, even if a metadata is not associated directly with an action, the action can still have corresponding metadata.

In accordance with one particular aspect of this disclosure, the method 600 can be embodied as network accessible service (e.g., Web service) for a virtual-machine-management system. Of course, various other embodiments are possible including incorporating or embedding the method 600 into a virtual-machine-management system.

FIG. 7 is a flow chart diagram of method 700 of provisioning information regarding virtual-machine-deployment actions. At reference numeral 710, an indication of an alternate execution mode is received. At numeral 720, one or more actions performed upon execution of one or more virtual-machine-deployment instructions are exposed in accordance with an indicated execution mode. For example, if a what-if mode is indicated, actions are exposed to report actions that would be performed upon execution of associated instructions. If a confirm mode is specified, actions can be exposed in a sequence allowing an administrator to authorize execution of each action or group of actions. If a verbose mode is indicated, actions can be exposed after instructions are executed to report actions actually performed. Furthermore, an execution mode can also be parameterized such that a reason why an action is performed is provided with an exposed action.

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 8:
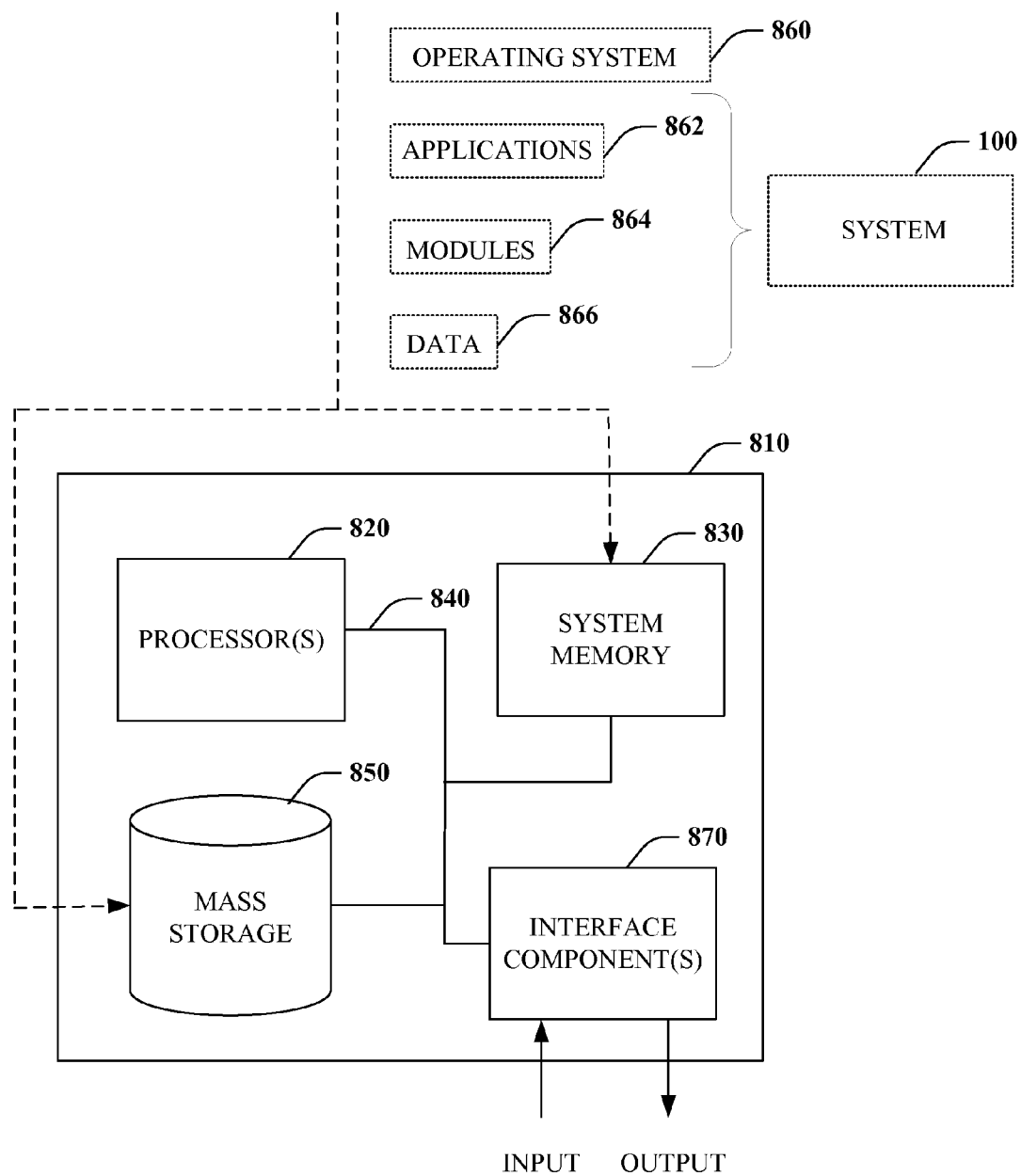
FIG. 8 is a schematic block diagram illustrating a suitable operating environment for aspects of the subject disclosure.

In order to provide a context for the claimed subject matter, FIG. 8 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 8, illustrated is an example general-purpose computer 810 or computing device (e.g., desktop, laptop, server, hand-held, programmable consumer or industrial electronics, set-top box, game system . . . ). The computer 810 includes one or more processor(s) 820, memory 830, system bus 840, mass storage 850, and one or more interface components 870. The system bus 840 communicatively couples at least the above system components. However, it is to be appreciated that in its simplest form the computer 810 can include one or more processors 820 coupled to memory 830 that execute various computer executable actions, instructions, and or components stored in memory 830.

The processor(s) 820 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 820 may also be implemented as a combination of computing devices, for example a combination of a DSP and a microprocessor, a plurality of microprocessors, multi-core processors, one or more microprocessors in conjunction with a DSP core, or any other such configuration.

The computer 810 can include or otherwise interact with a variety of computer-readable media to facilitate control of the computer 810 to implement one or more aspects of the claimed subject matter. The computer-readable media can be any available media that can be accessed by the computer 810 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 810.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 830 and mass storage 850 are examples of computer-readable storage media. Depending on the exact configuration and type of computing device, memory 830 may be volatile (e.g., RAM), non-volatile (e.g., ROM, flash memory . . . ) or some combination of the two. By way of example, the basic input/output system (BIOS), including basic routines to transfer information between elements within the computer 810, such as during start-up, can be stored in nonvolatile memory, while volatile memory can act as external cache memory to facilitate processing by the processor(s) 820, among other things.

Mass storage 850 includes removable/non-removable, volatile/non-volatile computer storage media for storage of large amounts of data relative to the memory 830. For example, mass storage 850 includes, but is not limited to, one or more devices such as a magnetic or optical disk drive, floppy disk drive, flash memory, solid-state drive, or memory stick.

Memory 830 and mass storage 850 can include, or have stored therein, operating system 860, one or more applications 862, one or more program modules 864, and data 866. The operating system 860 acts to control and allocate resources of the computer 810. Applications 862 include one or both of system and application software and can exploit management of resources by the operating system 860 through program modules 864 and data 866 stored in memory 830 and/or mass storage 850 to perform one or more actions. Accordingly, applications 862 can turn a general-purpose computer 810 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example, and not limitation, the system 100 that facilitates virtual-machine deployment, or portions thereof, can be, or form part, of an application 862, and include one or more modules 864 and data 866 stored in memory and/or mass storage 850 whose functionality can be realized when executed by one or more processor(s) 820.

In accordance with one particular embodiment, the processor(s) 820 can correspond to a system on a chip (SOC) or like architecture including, or in other words integrating, both hardware and software on a single integrated circuit substrate. Here, the processor(s) 820 can include one or more processors as well as memory at least similar to processor(s) 820 and memory 830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 that facilitates virtual-machine deployment and/or associated functionality can be embedded within hardware in a SOC architecture.

The computer 810 also includes one or more interface components 870 that are communicatively coupled to the system bus 840 and facilitate interaction with the computer 810. By way of example, the interface component 870 can be a port (e.g., serial, parallel, PCMCIA, USB, FireWire . . . ) or an interface card (e.g., sound, video . . . ) or the like. In one example implementation, the interface component 870 can be embodied as a user input/output interface to enable a user to enter commands and information into the computer 810 through one or more input devices (e.g., pointing device such as a mouse, trackball, stylus, touch pad, keyboard, microphone, joystick, game pad, satellite dish, scanner, camera, other computer . . . ). In another example implementation, the interface component 870 can be embodied as an output peripheral interface to supply output to displays (e.g., CRT, LCD, plasma . . . ), speakers, printers, and/or other computers, among other things. Still further yet, the interface component 870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of facilitating virtual-machine-deployment analysis, comprising:
   employing at least one processor configured to execute computer-executable instructions stored in memory to perform the following acts:
      receiving one or more declarative, virtual-machine-deployment instructions, wherein the one or more instructions are configured to invoke a process that achieves a predetermined end result regarding deployment of one or more virtual machines on one or more host machines;
      simulating execution of the one or more instructions, wherein the simulating follows execution logic of the process and reports one or more actions that would be performed during non-simulated execution to achieve the predetermined end result;
      determining a failure rate for a process instruction invoked by one of the one or more virtual-machine-deployment instructions; and
      exposing the failure rate in conjunction with a corresponding action of the one or more actions.

2. The method of claim 1 further comprises requesting user input on whether to proceed with simulating execution of at least one or the one or more deployment instructions.

3. The method of claim 1 further comprises exposing a remotely performed action for at least one of the one or more deployment instructions.

4. The method of claim 1 further comprises exposing at least one anonymized action.

5. The method of claim 1 further comprises executing the one or more virtual-machine-deployment instructions in an alternate execution mode.

6. The method of claim 1 further comprises exposing why the one or more actions are performed.

7. The method of claim 1, further comprising:
   outputting the failure rate in conjunction with the corresponding action of the one or more actions via a user interface.

8. The method of claim 1 further comprises invoking simulated execution of the one or more virtual-machine-deployment instructions based on a switch set for instructions that support returning an action performe.

9. A system that facilitates virtual-machine-deployment analysis, comprising:
   a processor coupled to a memory, the processor configured to execute computer-executable instructions stored in the memory, including computer-executable instructions that cause the system to:
      receive on one or more declarative, virtual-machine-deployment instructions, wherein the one or more instructions are configured to invoke a process that achieves a predetermined end result regarding deployment of one or more virtual machines on one or more host machines;
      simulate execution of the one instructions, wherein the simulated execution follows execution logic of the process and reports one or more actions that would be performed during non-simulated execution to achieve the predetermined end result;
      determine a failure rate for a process instruction invoked one of the one or more of the virtual-deployment-instructions;
      initiate exposure of the failure rate with a corresponding action of the one or more actions; and expose the one or more actions.

10. The system of claim 9, at least a subset of the one or more virtual-machine-deployment instructions comprise a procedure that automatically optimizes placement as a function of one or more computing resources.

11. The system of claim 9, at least one of the instructions is remotely executable.

12. The system of claim 9, at least one of the one or more actions is anonymized.

13. The system of claim 9, at least one of the one or more instructions are encapsulated within another instruction that specifies the one or more actions performed when the at least one of the one or more instructions are executed.

14. The system of claim 9, wherein the computer-executable instructions also cause the system to:
   output the failure rate and the corresponding action via a user interface.

15. The system of claim 9, wherein the computer-executable instructions also cause the system to:
   output the the one or more actions via a user interface.

16. A computer-readable storage medium having instructions stored thereon that enable at least one processor to perform a method upon execution, the method comprising:
   receiving one or more declarative, virtual-machine-deployment instructions, wherein the one or more instructions invokes a process that achieves a predetermined end result regarding deployment of one or more virtual machines on one or more host machines;
   initiating simulated execution of the one or more instructions, wherein each component that performs one or more actions in the process reports the one or more actions that would be performed rather than performing the one or more actions;
   determining a failure rate for at least one of the one or more instructions; and
   presenting the one or more actions and the failure rate on a display.

17. The computer-readable storage medium of claim 16, the method further comprises:
   determining metadata associated with at least one of the one or more actions; and
   presenting the metadata with the at least one action of the one or more actions.

18. The computer-readable storage medium of claim 17, determining the metadata comprises determining a reason the at least one of the one or more actions is performed.

19. The computer-readable storage medium of claim 17, determining the metadata comprises determining performance data with respect to at least one of the one or more actions.

* * * * *